United States Patent [19]
Le et al.

[11] Patent Number: 6,158,047
[45] Date of Patent: Dec. 5, 2000

[54] CLIENT/SERVER SYSTEM FOR FAST, USER TRANSPARENT AND MEMORY EFFICIENT COMPUTER LANGUAGE TRANSLATION

[75] Inventors: Bich-Cau Le, San Jose; Amit Patel, Cupertino; Anthony Fitzgerald Istvan, San Jose, all of Calif.

[73] Assignee: Hewlett-Packard Company, Palo Alto, Calif.

[21] Appl. No.: 09/111,956

[22] Filed: Jul. 8, 1998

[51] Int. Cl.[7] ..................................................... G06F 9/45
[52] U.S. Cl. ............................................... 717/5; 717/10
[58] Field of Search .................... 717/5–10; 712/200, 712/208, 209; 703/26, 27

[56] References Cited

U.S. PATENT DOCUMENTS

| | | | |
|---|---|---|---|
| 5,193,180 | 3/1993 | Hastings | 395/710 |
| 5,450,575 | 9/1995 | Sites | 395/707 |
| 5,708,811 | 1/1998 | Arendt et al. | 395/712 |
| 6,021,272 | 2/2000 | Cahill et al. | 395/705 |

OTHER PUBLICATIONS

Cmelik et al., "Shade: A fast instruction set simulator for execution profiling", Sigmetrics 94, ACM, 1994, pp 128–137.

Engler., "VCODE: A retargetable, extensible, very fast dynamic code generation", PLDI '96, ACM, 1996, pp 160–170.

Drake, "Using Linux to solve the problem of mixed operating system LAN services", ACM, 1997, pp 67–72.

Srivastava et al., "Link–time optimization of address calculatiuon on a 64–bit architecture", SIGPLAN '94, ACM, 1994, pp 49–50.

Evans, "Static detection of dynamic memory errors", PLDI '96, ACM, 1996, pp 44–53.

Chiueh et al., "A compiler–directed distributed shared memory system", CS'95, ACM, 1995, pp 77–86.

Wickline wt al., "Run–time code generation and Modal–ML*", SIGPLAN '98, ACM 1998, pp 224–235.

*Primary Examiner*—Kakali Chaki

[57] ABSTRACT

An apparatus for translating a multiple user program into a native machine code to run on a native computer hardware having memory and an operating system that is capable of detecting whether the program has an instruction set architecture different from a native instruction set architecture. The memory has a source file including the program to be translated. At least one source code module is defined as including a plurality of blocks of code mapped to the memory by the operating system. The blocks have one or more source instructions, with each block beginning with one of the source instructions and ending with a branch or a target of the branch. A virtual instruction pointer points to one of the source instructions to be executed. One or more source instructions are dynamically translated and executed, and a profile data is produced. A shared translation file is ultimately created for the source code module using the profile data. The shared translation file is periodically offered to at least one of the users.

15 Claims, 5 Drawing Sheets

Fig. 4

CLIENT/SERVER SYSTEM FOR FAST, USER TRANSPARENT AND MEMORY EFFICIENT COMPUTER LANGUAGE TRANSLATION

BACKGROUND

The present invention relates generally to a system for interpreting source programs into a native language. More particularly, the present invention relates to a client-server system which can combine static compilation, and dynamic compilation to obtain the advantages of these traditional systems while avoiding their drawbacks.

When a program is written in a source code language different from a native machine code language, executing on a native machine requires either translating the source code into the native machine code or interpreting the source code. The source code language may be high-level, like C, C++ or Pascal, or low-level, such as a machine language for a given source instruction set architecture (ISA). A native machine can only execute native machine instructions and such instructions may be semantically or syntactically different from the source ISA. Since a computer hardware cannot run source code directly on a native machine containing a native ISA different than the source ISA, various methods are utilized to run the source code on the native machine. Such methods include pure interpretation, static compilation, and dynamic compilation. Each method alone entails certain advantages and disadvantages.

In pure interpretation the source program is never really converted into machine code. An interpreter reads one instruction at a time from the source program, determines what task the instruction should accomplish, carries out the action, and then fetches the next instruction. A problem with pure interpretation, however, is that it runs slowly compared to programs which are written in, or translated to, machine code.

During translation, a compiler interprets blocks of instructions written in the source language and converts them into native machine instructions which can be understood and executed by the hardware directly. A block of instructions is a contiguous group of instructions that end in a branch. The translated blocks of instructions can run more quickly than the nontranslated instructions of the source program. Two methods of translation are a static compilation system (SCS) and a dynamic compilation system (DCS).

Static translation necessitates that a user take the source program and feed it through a compiler. A static compiler will produce a new program in native machine code which the hardware can execute without an interpreter. An advantage is that the final program can run fast compared to interpretation because the converted program is already in the native machine form. Additionally, the SCS can afford to spend time to generate optimal machine code since the SCS compiles the program into machine code before the user executes the program. Once the compiler translates the program, the user can run the translated program.

Another advantage is that the SCS can produce memory efficient programs. Programs consist of code and data. Often many users are connected to the same system, and, while data for a particular program may differ between users, the users can utilize the same translated code. For a statically compiled program, since the code portion does not change once the program is compiled, multiple users connected to the same system can share that code. Thus, if the size of the code for a particular program is, for example, 1 megabyte, and there are 100 users, then 100 megabytes of memory would be necessary to store the program for all of the users on the system. On the other hand, if the 100 users could share that same code, then only 1 megabyte of memory would be necessary to store the program.

A problem with the SCS, however, is that the SCS requires user intervention. Compiling with the SCS can be complicated because it requires the user to both execute the compiler and supply the correct support file infrastructure. To compile the source program, the user has to find a compiler, determine how to use the compiler, generate the final program, and then run the final program. Additionally, after the SCS has translated the program, the user needs to maintain two sets of files, the original source file and the compiled executable file.

Another problem with the SCS is the difficulty in utilizing profile information to optimize the translated program. While the SCS compiled program can run faster than interpretation, modern computer architecture requires compilers to do an even better job of optimizing the program to take advantage of the hardware. To accomplish better translations, the compiler needs to understand how the program behaves at run time. To understand how the program works at run time, the compiler creates an instrumented version of the program. The instrumented version of the program can collect profile data as the program runs for the specific hardware. The programmer can utilize the profile data to recompile the original program to create an optimized version of the program. Thus, with the SCS, the programmer must perform the extra steps of compiling the program to create an instrumented version, running the instrumented version, often more than once, to collect profile data, and then recompiling the program using the profile data to optimize the program. Because of the additional time and effort required to use the profile data, many programmers tend to avoid utilizing profile data with the SCS.

Yet another problem with the SCS is the fact that the SCS may not be able to discover and translate all of the source code language in a source file. This condition could occur, for example, if the source file is written in low-level source code different from the host machine's language. Such programs can contain a mixture of code and data, and the: SCS may not always be able to tell the difference between the code and the data. Likewise, dynamically generated, or self-modifying, source code poses a problem to the SCS. Dynamically generated code is code that is created and exists only at run time. Thus, the dynamically generated code is nonexistent when the SCS translates the source code into machine code, and the SCS will not translate any dynamically generated code.

On the other hand, the DCS can handle situations that the SCS cannot handle well. First, the DCS can perform translation without user intervention. The user need only present the source program to the DCS, and the DCS will automatically recognize the fact that the source program cannot be executed directly on the native machine in its current form. Thereafter, the DCS will translate the source program into machine instructions and then run the program for the user. Additionally, the DCS will transparently store the machine instructions that it generates in a memory buffer. Therefore, unlike the SCS, the user will see only one program, i.e. the source program, instead of two, the source program and the executable program. Second, the DCS can translate the source code into machine code as the program runs. Therefore, the DCS can handle dynamically generated or self-modifying code. Finally, the DCS can collect and utilize profile information as it executes the program. Thus, the DCS can utilize the profile data to optimally translate programs for specific hardware.

A problem with the DCS is that it is not memory efficient, unlike the SCS, due to the lack of code sharing. The DCS stores the translated machine code in a memory buffer for each user. Thus, if there are 100 users and the machine code buffer is 1 megabyte in size, then the total memory consumption is 100 megabytes. Additionally, the buffer is usually limited to certain size. If the DCS exceeds the buffer size, it deletes the stored code, which the DCS will again need to translate.

Another problem with the DCS is that it is vulnerable to short running programs, since a certain overhead is associated with dynamic compiling. If the program only runs for a few seconds, for example, then the time spent to generate the machine code will be wasted, since the user is utilizing the code for only a short period of time. DCS translated machine code gets thrown away when the program terminates. The next time the user runs the same program, the dynamic compiler has to recompile the program. Additionally, analyzing profile information and generating good machine code consumes time. Yet, the DCS can afford to spend only a limited amount of time analysing the profile information, or the user will perceive that the program is executing slowly. Accordingly, even though the DCS has the opportunity to gather profile information which could give the DCS a chance to generate very good machine code, in practice DCS's are not very aggressive optimizers because they cannot afford to spend too much time optimizing, unlike the SCS.

Digital Equipment Company combined a pure interpreter and the SCS and released a product called FX!32. The FX!32 is a client-server system which works initially as a pure interpreter and collects profile data. After the program terminates, the server can create a translated version of the program using the profile information. Thereafter, as the user re-launches the program, or others launch the program, the translated version of the program can be utilized. A problem with the FX!32 is that the system only asks the server for the translated version of the program as the user launches the program. If no translated version of the program exists when the user launches the program, only pure interpretation is available to translate the program, which can be a slow process. Therefore, if a translated version of the program becomes available after the user launches the program, the client will not be able to utilize the translated version as the programming is running.

Another problem is that the FX!32 cannot send profile information to the server before the program terminates. Therefore, even if the client has produced enough profile: data to allow the server to construct an optimally translated program, the server cannot utilize: the profile information until the program terminates. Additionally, the FX!32 only uses pure interpretation and static translation, and not dynamic translation, to run source programs. Thus, the FX!32 is prone some of the same problems associated with the SCS.

Accordingly, in response to the problems discussed above, a primary object of the present invention is to provide an improved apparatus for translating the source program as the program executes at run time, without requiring the program to terminate.

Another object of the present invention is to provide such an improved apparatus which discovers and translates all the source code in the source file as well as the dynamically generated code.

A further object of the present invention is to provide such an improved apparatus which collects, analyzes, and periodically submits profile data to enable optimizations which lead to better machine code quality, thus better performance when executing that code.

An additional object of the present invention is to provide such an improved apparatus which periodically maps new translated code to shared memory so that multiple users can simultaneously execute the code.

These and other objects of the present invention will be apparent from the following detailed description of the invention, while referring to the attached drawings in which:

TABLE OF ACRONYMS

This patent utilizes several acronyms. The following table is provided to aid the reader in determining the meaning of the several acronyms:

DCS=dynamic compilation system.
IP=instruction pointer.
ISA=instruction set architecture.
SCM=source code module.
SCS=static compilation system.
SFR=source file record.
TLB=translation lookaside buffer.
VIP=virtual instruction pointer.

DETAILED DESCRIPTION OF THE PREFERRED EMBODIMENT

Broadly stated, the present invention combines static translation, and dynamic translation techniques in a client-server implementation to perform user transparent and memory efficient computer language translation.

More specifically, the present invention is an apparatus for automatically translating a program into a native machine code to run on a native computer hardware. A source file is detected by an operating system as being written for an instruction set architecture different than a native instruction set architecture. A main source code module (SCM) of the source file is then mapped to a shared memory by the operating system. The SCM includes blocks of source code, and the source code includes source instructions. The block begins with the source instruction and ends with a branch or a target of a branch. A virtual instruction pointer points to the source instruction of the block to be executed. The source instructions are executed by dynamic translation until an optimized shared static translation for the block exists. The shared translation file is created for the SCM, and is periodically offered to system users after the shared translation file exists, even before the user terminates the program.

While the present invention refers to a UNIX® operating system, the present invention can be used with other operating systems such as WINDOWS NT®, WINDOWS 95®, and MACINTOSH®. The present invention uses UNIX® system calls for example purposes only. Each operating system includes system calls that correspond to UNIX® system calls and can be utilized by the present invention.

Figure 1:
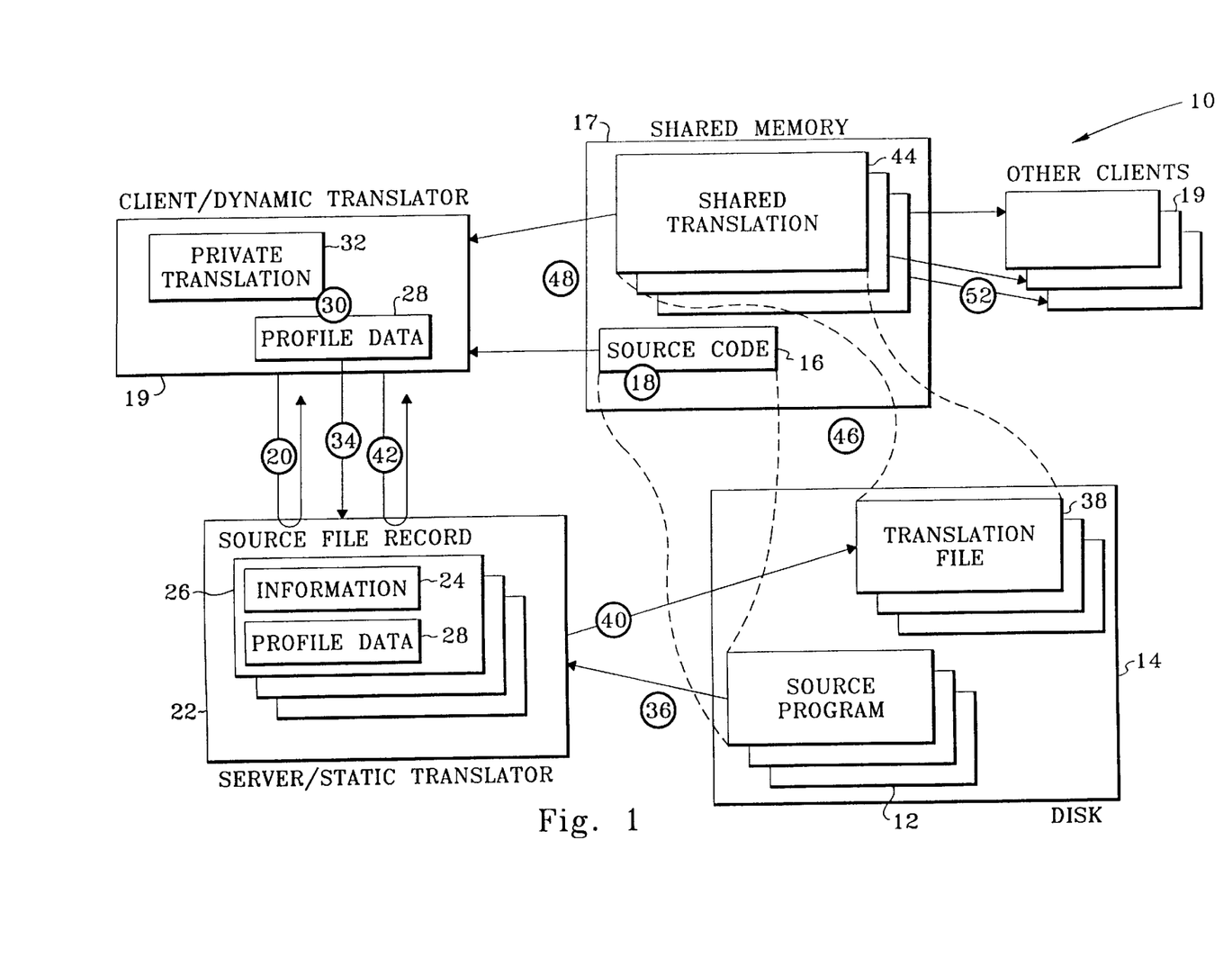
FIG. 1 is a block diagram overview of the present client-server system.

A system overview is shown in FIG. 1 of the present client-server invention, generally designated as 10. A user launches a source program 12 usually located on a disk 14. An operating system detects that the source program 12 is different from a native code. The source program 12 consists of one or more SCMs 16. Each module 16 is a file on the disk 14 that can be loaded to a shared memory 17 separately. The source program 12 must have at least a main module, and, optionally, a set of peripheral modules called libraries. The operating system loads the main SCM 16 of the source program 12 into shared memory 17 (step 18)(the encircled numbers shown in FIG. 1 identify various steps carried out by the present client-server invention). In turn, the main module is responsible for loading the libraries. The operating system also loads a client 19, in this case a dynamic translator, and transfers control to the client 19.

The client 19 computes a signature to uniquely identify the SCM 16, and sends the signature to a server 22, a static compiler (step 20). The signature consists of information 24 that uniquely identifies the SCM 16, including, which sections of the file are used as code and data, the section's size, and where in memory the SCM 16 is mapped. The client 19 can compute the signature by using a UNIX® STAT system call for the main module, and a UNIX® MMAP system call for each library. The server 22 determines if the signature is registered in the server's database. If the signature does not exist in the database, the server 22 creates a new source file record (SFR) 26 for the SCM 16. Additionally, the client 19 only monitors the modules it is using. Therefore, the client 19 can also intercept a MUNMAP system call, and remove a signature from the client's active list when the module is not in use.

Figure 2:
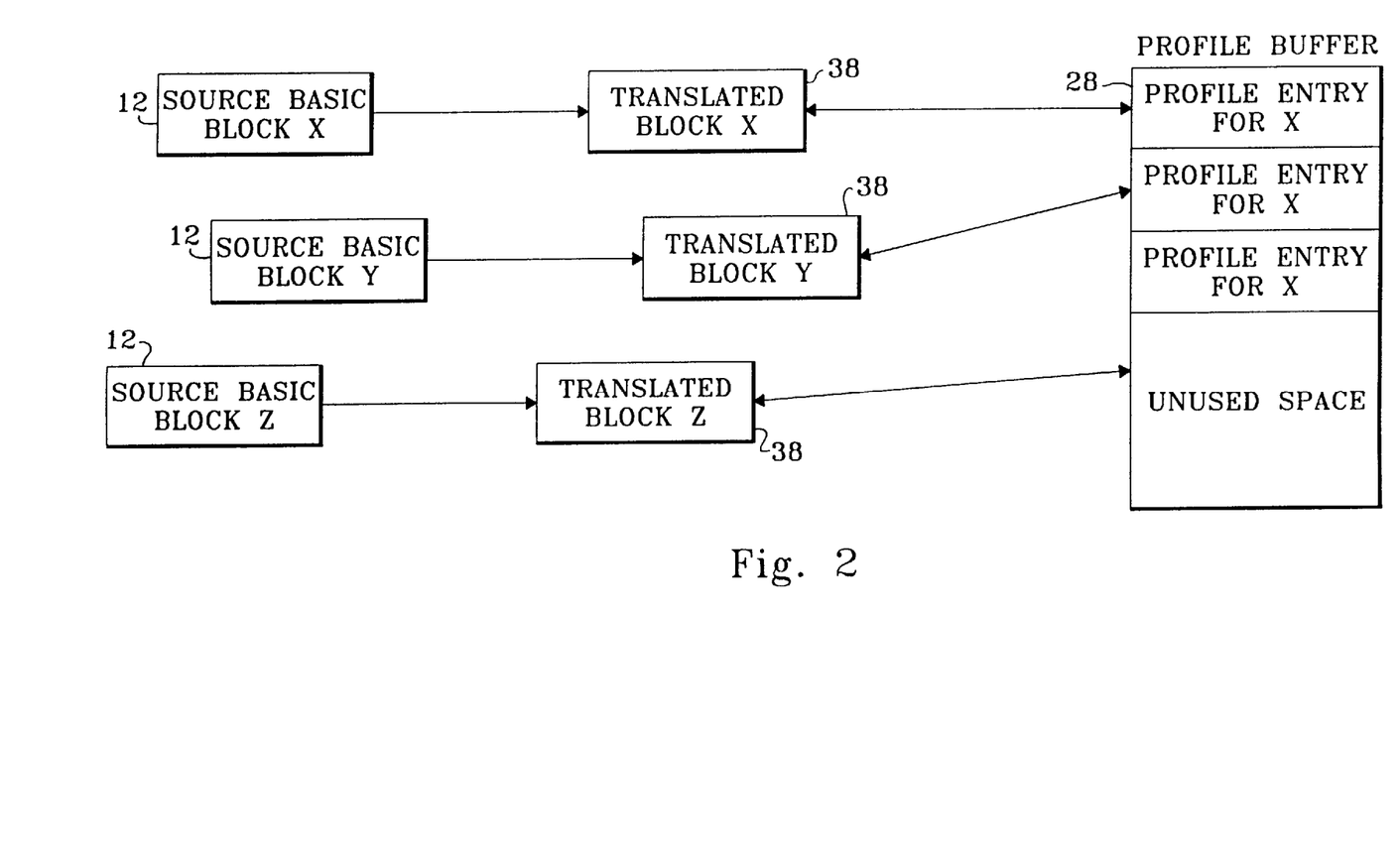
FIG. 2 shows profiling data corresponding to translated blocks.

If a translated version of the source program 19 does not exist, the client 19 executes the source program 12 by dynamically translating blocks of the source code to native code. In addition to translating the blocks to a native code, the client 19 adds special native instructions to gather profile data 28 about each block. The purpose of a dynamically translated block is to profile the run-time behavior of the source block. Profiling generally means monitoring the behavior of a branch which terminates the block. For example, if a conditional branch has two targets, the profiling instructions can count the number of times each target is taken. Thus, the profile data 28 generally consists of one or more counters to count the number of time that each target is taken by a particular branch. The new native code is stored (step 30) in a private buffer labeled private translation buffer 32. The client 19 executes the code with the special instructions to produce the profile data 28. The profile data 28 is stored in a private memory buffer corresponding to the translated block (see also FIG. 2).

Periodically, the client 19 empties the profile data 28 by submitting the buffer contents to the server 22 (step 34). To submit the profile data 28 the client 19 opens a connection with the server 22, sends the data which contains the signatures for the SCMs 16 being profiled, sends all the profile entries, and closes the connection with the server 22. The server 22 stores the profile data 28 corresponding to the SCM 16 being profiled in a profile buffer. If profile data 28 already exists, the new data is merged into the existing data. The profile submission can occur when the profile buffer is full, when a counter in a profile entry reaches a maximum value, and when the program terminates.

As the server 22 obtains enough profile data 28 for the SCM 16, the server 22 initiates a translation. First, the SCM 16 is read from the disk 14 (step 36). Then the static translator uses the profile data 28 to produce optimized native code for the source file, and. stores the native code in a translation file 38 (step 40). The SFR 26 is updated to indicate that a translation file is now available for that SCM 16. Periodically, the client 19 asks the server 22 for a translation file 38 for the source code that the client 19 is executing (step 42). The server 22 replies with a message indicating that a shared translation file does exist, and. specifies the location on the disk 14. The client 19 submits profile data 28 and empties its profile data and private translation buffers, and maps the translation file 38 to shared memory 17 (step 46).

The client 19 can then execute the source program 12 by executing the shared. translation (step 48) instead of dynamically translating the source program 12. Similarly, if other clients 19 are running the same source program 12, they can also execute the shared. translation file (step 52). If the source program 12 jumps to blocks of code that were not translated by the server 22 the first time, the client 19 will dynamically translate those blocks, and profile data 28 will be generated for those blocks. In the future, the client 19 will send that profile data 28 to the server 22, and the server 22 can eventually re-translate the source program 12 using the profile data 28 to optimize the code for the new sections, and include the translations for the new sections in the translation file 38. Thus, the system is adaptive.

Figures 3, 3B:
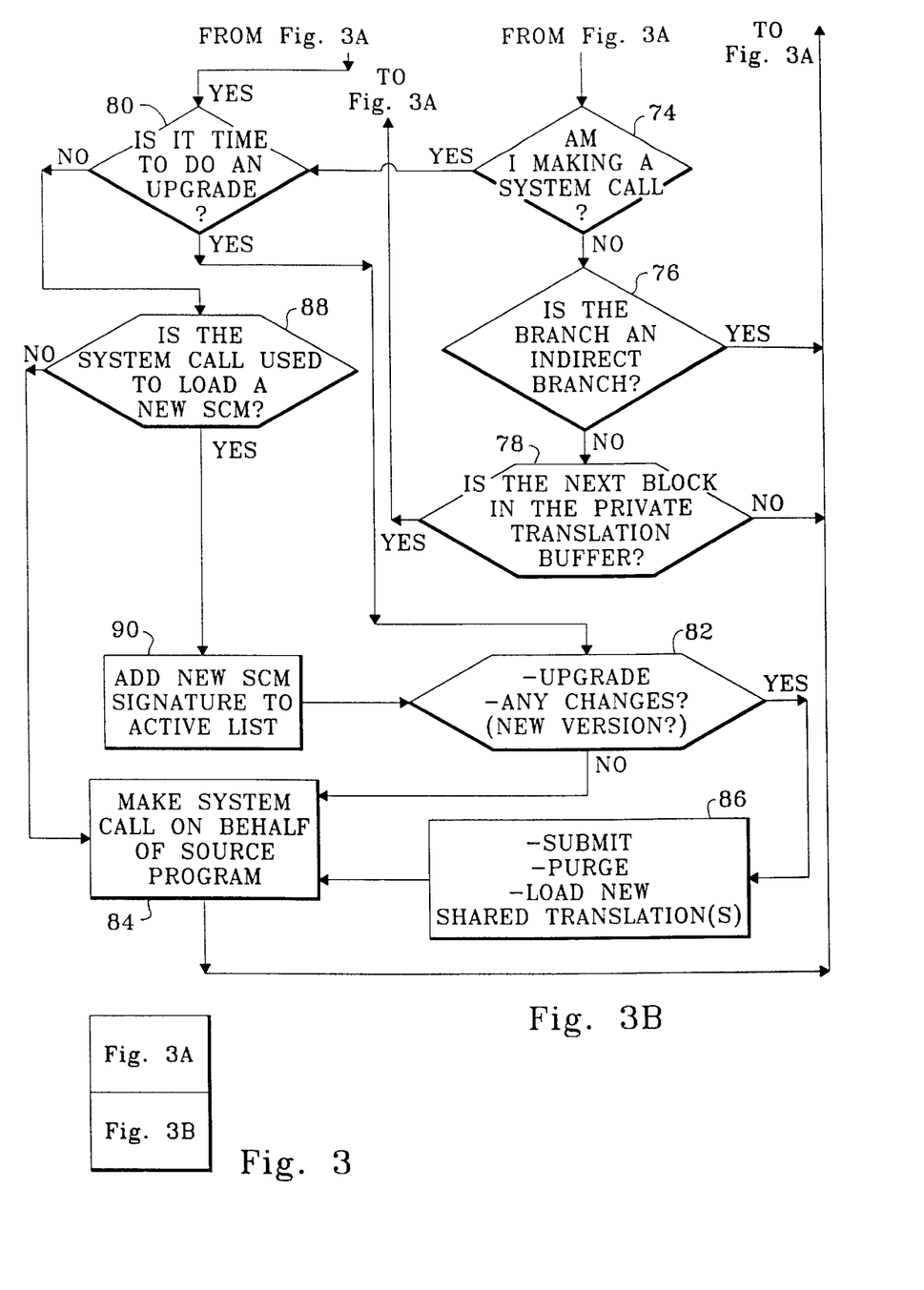
FIG. 3 shows a detailed flow chart of a preferred embodiment of the present invention.

A flowchart of a preferred embodiment of the present invention is shown in. FIG. 3. As the client 19 runs the program, the operating system loads the main module to the shared memory 17, and the client 19 computes a signature for the SCM 16 (block 54). The client 19 then adds the signature to an active list, and initializes a translation lookaside buffer (TLB) 56, a private translation buffer 58, a private address map 60, and a profile buffer 62 (block 54) (see also FIG. 4). The TLB 56 stores instruction pointer mappings, both discussed below, regardless of whether they come from shared or private address maps. The client 19 then asks for a latest translation, if any, of the main module, referred to as an upgrade operation (block 54).

An upgrade operation is performed, since at any given time, multiple versions; of shared translation files for the same SCM 16 may exist. For example, if the client 19 is, running a program foo, a list of active SCMs 16 and associated translation files could look like:

| ACTIVE SCM | ASSOCIATED TRANSLATION FILE |
| --- | --- |
| foo | foo_translation, version 6 |
| foo_library1 | <none> |
| foo_library2 | foo_library2_translation, version 2 |

In general, the server 22 tries to get all clients 19 using a given SCM 16 to use the latest version of the associated translation file so that the server 22 can delete old versions. The old version cannot be deleted from the disk 14 until no clients 19 are using the old version. Therefore, the client 19 periodically checks to see if it is using the latest versions. Obtaining the latest versions is achieved by performing the upgrade operation (block 54).

The upgrade operation consists of the following steps. First, the client 19 opens a connection with the server 22. For a UNIX® system the connection can be achieved with a SOCKET system call. Second, the current list of active SCM 16 signatures is sent to the server 22, for example foo, foo_library1, and foo_library2. Third, the server 22 responds with a list of the latest translation file versions for each SCM 16, for example (foo_translation, version 7), (none for foo_library1), and (foo_library2_translation, version 2). Finally, the client 19 closes the connection.

The client 19 then checks the versions specified by the server 22 against the client's versions. If, for a given SCM 16, the most up-to-date translated version is higher than the current version used by the client 19, or, the client 19 is not currently using a translation file but one now exists, then the current version is unloaded and the new version is loaded to the client's address space. In the above example, the client 19 would unload version 6 of foo_translation, and load version 7. If no other clients 19 are using version 6. the server 22 is free to delete version 6 from the disk 14. The convenient times to perform an upgrade operation are at process initialization, when the program loads a new library via MMAP, and periodically, when the program makes a system call if some time has elapsed. since the last system call.

Next the client 19 sets a virtual instruction pointer (VIP) to the address of the first source instruction, (block 54). Then the client 19 jumps to an address lookup sequence (block 64).

The purpose of the address lookup sequence is to determine if translated code exists for a current VIP (block 64). All ISAs use the concept of an instruction pointer. The instruction pointer is a special register which contains a memory address of an instruction to execute. After executing the instruction, a machine updates the instruction pointer to point to a next instruction to execute. A runtime system component of the translation system manages the execution of the source code blocks on a native machine, and enables the source program 12 to perceive that the source program 12 is running on a source ISA machine. The term VIP is used to distinguish a source ISA instruction pointer value from the native ISA instruction pointer which is referred to hereinafter as IP.

Figure 4:
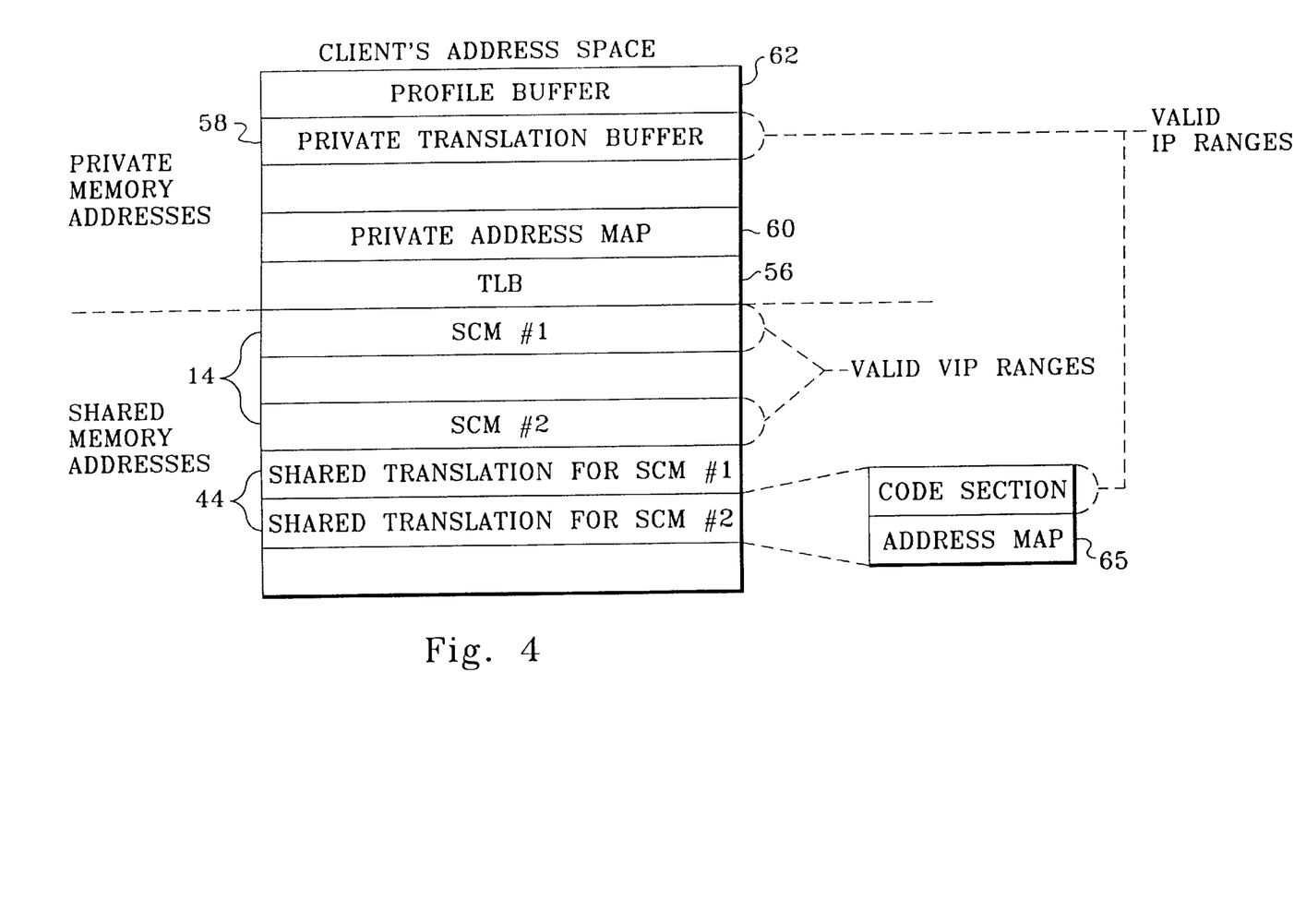
FIG. 4 shows an address space layout.

The runtime system determines if a translated code exists for that VIP (block 64) by using an address map. The address map is a table which uses the VIP value as an input, and returns an IP value corresponding to a memory of where a statically or dynamically translated block of code for that VIP, if that code exists. In other words, the table is conceptually a set of VIP value and IP value pairs. As shown in FIG. 4, dynamic map 60 exists for dynamically translated blocks, and a static map 65 exists for each statically translated SCM 14. The LOOKUP operation can be slow, however, since a multitude of steps are required to search the various address maps 60, 65. The present invention uses the TLB 56 to improve the performance of the LOOKUP operations.

The TLB 56 is utilized in the following manner. For a given active SCM 16. a source code block located at VIP x can have a statically translated native block at IP y, a dynamically translated native block at IP z, or no translation. During execution, to determine whether a certain VIP x value has a translation, the address maps can be searched in this order:

1. For each active SCM 16, if the SCM 16 has an associated shared translation, search that shared translation's address map for an entry of the form (x, y). If an entry is found, return y.
2. If step 1 fails, search the private address map for an entry of the form (x, z). If an entry is found, return z.
3. If step 2 fails, return the value zero.

This method can be slow, however, as discussed above, therefore the TLB 56 is added to store VIP-to-IP mappings, regardless of whether they come from the shared or private address maps, thus bypassing steps 1, 2, and 3 when the map exists in the TLB 56. For the present invention, the operation IP=LOOKUP(VIP) (block 64) is defined as follows:

1. Search the TLB 56. If an entry with the specified VIP is found, return the corresponding IP.
2. If step 1 fails, search the shared address maps. If an entry is found, insert the entry into the TLB 56. Return the corresponding IP.
3. If step 2 fails, search the private address map. If an entry is found, insert the entry into the TLB 56. Return the corresponding IP.
4. If step 3 fails, return an IP value of zero, indicating that no entry with the specified VIP was found.

The TLB 56 has a limited number of entries, therefore when an entry is inserted, an existing entry may have to be removed. Two possible implementations for the TLB 56 are direct-mapped and set-associative, which are well known techniques in the art.

In general, after executing one block of translated code, the LOOKUP operation is required to determine the IP for the next VIP (block 64). An exception to the general rule occurs when the branch which terminates the source code block is direct, i.e., has at most two possible targets, both of which are constant VIP values. At translation time, for each VIP, the translator performs a LOOKUP operation on the VIP, and, if a non-zero IP is returned, then the translator generates a direct native branch from the block to the next translated block located at that IP address.

The LOOKUP operation is necessary when the next VIP is not a constant, i.e. is provided by a register through an indirect branch, or the next VIP has not been translated. When the source program branches to VIP x which has not yet been translated, the source code beginning at x is dynamically translated, and the translated block is placed in the private translation buffer at some address z. An address map entry (x, z) is added to the private address map 60 to reflect the new mapping. Thus, returning to FIG. 3, in the present invention, if VIP x has not yet been translated, the client 19 executes blocks of the SCM 16 by dynamically translating the blocks to a native code (block 66).

The client 19 stores the dynamically translated block in a private translation buffer 32, creates a new entry in a private address map, and creates a new profiling entry (block 66). The client 19 then determines whether any of the operations require a purge (block 68). The purge operation can be triggered for various reasons. Here, the purge operation is required when either the private translation buffer is full, or the private address map is full. If a purge operation was required, the client 19 will submit the profile data 28 to the server 22, perform the upgrade operation, and conduct the purge operation (block 70).

When the purge operation occurs, the dynamically translated blocks are deleted since the profile entries that the translated blocks are referencing no longer exist. Thus, the private translation buffer is also emptied. Emptying the private translation buffer also invalidates existing mappings for those translated block, therefore the private address map is emptied. Finally, the TLB 56 is emptied since the TLB 56 may contain stale private address map entries.

While the purge may seem wasteful, because so much of what the client 19 created is deleted, the purpose of the dynamically created objects is to supply the server 22 with profile data 28 so that the server 22 can produce optimal shared translations. Over time, the shared translation for a given SCM 16 will grow. Newer versions of the translation file will have more optimized blocks. The client 19 no longer needs to dynamically translate those blocks, since the shared translation can be utilized. Thus over time, as the number of dynamically translated blocks decreases, the number of private address map entries and profile entries will also decrease. In the long run, there is little work for the client 19 to accomplish. In this steady state condition, performance is maximal because the client 19 uses very little private memory, statically translated code which is highly optimized is executed, and the client 19 spends less time profiling.

After the block has been translated, the client 19 returns to the lookup sequence (block 64).

If the LOOKUP operation succeeds, the operation returns a non-zero IP value. The IP value is an address of a translated block. The client 19 will jump to that IP address (block 71). If the translated block was dynamically translated, the translated block resides in the private translation buffer 32. The translated code executes, updates its profile entry, and determine whether a counter has reached a maximum value (block 72). If the counter has reached a maximum value, then the profile data 28 is submitted and a purge operation is performed (block 70). When the counter has not reached a maximum value, the client 19 determines whether the source program 12 needs to perform a system call (block 74). If the system call is not needed, then a determination is made as to whether or not the current source block ends in an indirect branch (block 76).

If the current block does not end in an indirect branch (block 76) and the next block has been translated and stored to private memory (block 78), then control is transferred to the translated block stored to private memory (block 72). Otherwise, the next VIP value is determined and control is transferred to the lookup sequence (block 64).

When the client 19 makes a system call (block 74), the client 19 determines whether a certain time has elapsed, for example five minutes, since the client 19 last checked the server 22 for any newer version of the shared translations 44 for the active SCMs 16 (block 80). If the time has elapsed since the last upgrade, the client 19 performs an upgrade operation (block 82). If the client 19 does not require a new version (block 82), the client 19 makes a system call on behalf of the source program 12 (block 84) and determines the next VIP (block 64). When the client 19 requires any new version of the shared translations 44 (block 82), however, the client 19 submits the profile data 28, performs a purge operation, and loads the new shared translations (block 86) before making a system call on behalf of the source program 12 (block 84).

If the time has not elapsed since the last upgrade (block 82), then the client 19 determines whether the system call is used to load the new shared translations 44 (block 88). When a new shared translation 44 is not loaded, the client 19 makes a system call on behalf of the source program 12 (block 84) and determines the next VIP, then returns to the lookup sequence (block 64). Upon the loading of a new shared translations 44, however, a signature for the SCM 16 is computed and added to the active list (block 90), and an upgrade operation is performed (block 82).

If the LOOKUP operation returns with an IP corresponding to a translated block in a shared translation file, the client 19 executes the optimized code (block 92). Next, the client 19 determines whether or not the source program 12 needs to perform a system call (block 94). If the system call is needed, then the client 19 determines whether the time has elapsed to perform an upgrade operation (block 80). If the system call is not needed, then a determination is made as to whether or not the current source block ends in an indirect branch (block 96).

If the current block does not end in an indirect branch (block 96) and the next block has been translated and stored to shared memory (block 98), then control is transferred to the translated block stored to shared memory (block 92). Otherwise, the next VIP value is determined and control is transferred to the lookup sequence (block 64).

From the foregoing description, it should be appreciated that an improved translation system has been shown and described which has many desirable attributes and advantages. The present invention is adapted to translate source programs as the program executes at run time, without user intervention. Further, the present invention discovers and translates all the source code in the source file as well as the dynamically generated code. Also, it periodically collects and analyzes profile data to enable optimizations which lead to better machine code quality, thus better performance when executing that code. Similarly, the present invention periodically maps translated code to shared memory so that multiple users can simultaneously execute the code, thus preserving valuable memory.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. An apparatus for translating a multiple user program into a native machine code to run on a native computer hardware having memory means and an operating system that is capable of detecting whether the program has an instruction set architecture different from a native instruction set architecture, the memory means having a source file comprising the program to be translated, said apparatus comprising:

means for defining at least one source code module comprising a plurality of blocks of code mapped to the memory means by the operating system, said blocks having one or more source instructions, with each block beginning with one of said source instructions and ending with a branch or a target of said branch;

means for creating a virtual instruction pointer which points to one of said source instructions to be executed; and means for executing at least one of said source instructions by translating corresponding at least one said block, storing said translated block in a private translation buffer, and creating a shared translation file for said translated block so that said shared translation file is adapted to be accessed by at least one of a plurality of clients.

2. The apparatus in claim 1 further comprising:

means for determining if said block of said block of said source code module has been translated and stored to said private translation buffer; and means for creating said private translation buffer when an instruction pointer corresponding to said virtual instruction pointer contains a predetermined value.

3. The apparatus in claim 2 further comprising:

means for specifying a signature for each said translated block and sending said signature to a server database;

means for determining whether said signature is registered in said server database; and means for creating a source file record for said signature a first time that a client sends said signature to said server database, and then setting said instruction pointer to zero.

4. The apparatus in claim 2 wherein said private translation buffer creating means includes a dynamic compilation system for dynamically translating said block of said source code module to create said private translation buffer of said block and profile data for said block and stored in a profile buffer, said profile data being periodically sent to a server and stored in a source file record for said source code module being profiled, and said instruction pointer corresponding to said virtual instruction pointer obtaining a value of a memory location for said private translation buffer.

5. The apparatus in claim 4 wherein said private translation buffer creating means which periodically sends said profile data further comprises:

means for opening a connection with said server to send said profile data when the program terminates, said profile buffer is full, or a counter reaches a maximum value;

means for sending a signature for said block being translated;

means for unloading said profile data to said server;

means for closing said connection; and means for performing a purge operation.

6. The apparatus in claim 5 wherein said means for performing said purge operation further comprises:

means for deleting dynamically translated blocks; and means for emptying at least said profile buffer.

7. The apparatus in claim 1 wherein said shared translation file creating means includes a static compilation system for automatically statically translating said block of said source code module utilizing said profile data, said shared translation file being mapped to a shared memory, and said instruction pointer corresponding to said virtual instruction pointer obtaining a value of a memory location for said shared translation file.

8. The apparatus in claim 1 further comprising:

means for opening a connection with a server at process initialization, when the program loads a corresponding library, and when the program performs a system call if a predetermined time has elapsed;

means for sending a current list of active source code module signatures being used by at least one of said plurality of clients to said server;

means for responding to said client with a list of latest translation file versions;

means for checking said latest version list against a current version that said client is using, and updating said client version with a latest translation file version when said latest translation file version is higher and removing said current version from a memory of said client; and means for deleting said current version when no said plurality of clients is using said current version.

9. A method for translating a multiple user program into a native machine code to run on a native computer hardware having memory means and an operating system that is capable of detecting whether the program has an instruction set architecture different from a native instruction set architecture, the memory means having a source file comprising the program to be translated, said method comprising the steps of:

defining at least one source code module comprising a plurality of blocks of code mapped to the memory means by the operating system, said blocks having one or more source instructions, with each block beginning with one of said source instructions and ending with a branch or a target of said branch;

creating a virtual instruction pointer which points to one of said source instructions to be executed;

translating at least one of said blocks beginning with said virtual instruction pointer pointing to said source instruction to be executed, storing said translated block in a private translation buffer, and creating a shared translation file for said executed block so that said shared translation file is adapted to be accessed by at least one of a plurality of clients.

10. The method in claim 9 wherein said steps of translating and storing said block comprise the steps of:

checking a translation lookaside buffer to determine the existence of a native address corresponding to said virtual instruction pointer and executing said block beginning at said native address;

determining the existence of a map address corresponding to said virtual instruction pointer having no corresponding native address in said translation lookaside buffer;

updating said translation lookaside buffer to include an existing map address as said native address, and executing said block beginning at said address;

translating said block beginning at said virtual instruction pointer when said native address and said map address do not exist, and storing said translated block in said private translation buffer; and updating said virtual instruction pointer to point to said next instruction to be translated.

11. The method in claim 10 wherein said translation of said block is performed with a dynamic translator, said dynamic translator adding special instruction to said translated block to create profile data for profiling characteristics of said block, said profile data being stored in a profile buffer and periodically sent to a static translator.

12. The method in claim 11 wherein static translation is performed with said static translator using said profile data to create an optimized code, storing said statically translated code in a memory to be used by at least one client, and updating a list of latest translating file versions.

13. The method in claim 11 wherein said periodically sending of said profile data comprises the steps of:

opening a connection with a server to send said profile data when the program terminates, said profile buffer is full, and a counter reaches a maximum value;

sending a signature for said block being translated;

unloading said profile data to said server;

closing said connection; and performing a purge operation.

14. The method in claim 13 wherein said purge operation includes deleting dynamically translated blocks, emptying said profile buffer, said address map, and said translation lookaside buffer.

15. The method in claim 9 further comprising a step of performing an upgrade operation including the steps of:

opening a connection with a server at process initialization, when, the program loads a corresponding library, and when the program, performs a system call if a predetermined time has elapsed;

sending a current list of active source code module signatures being used, by at least one of said plurality of clients to said server;

responding to said client with a list of latest translation file versions;

checking said latest version list against a current version that said client is using, and updating said client version with a latest translation file version when said latest translation file version is higher and removing said current version from a memory of said client; and deleting said current version when no said plurality of clients is using said current version.

* * * * *

UNITED STATES PATENT AND TRADEMARK OFFICE
CERTIFICATE OF CORRECTION

PATENT NO.   : 6,158,047
DATED        : December 5, 2000
INVENTOR(S)  : Bich-Cau Le et al.

Figure 3A:
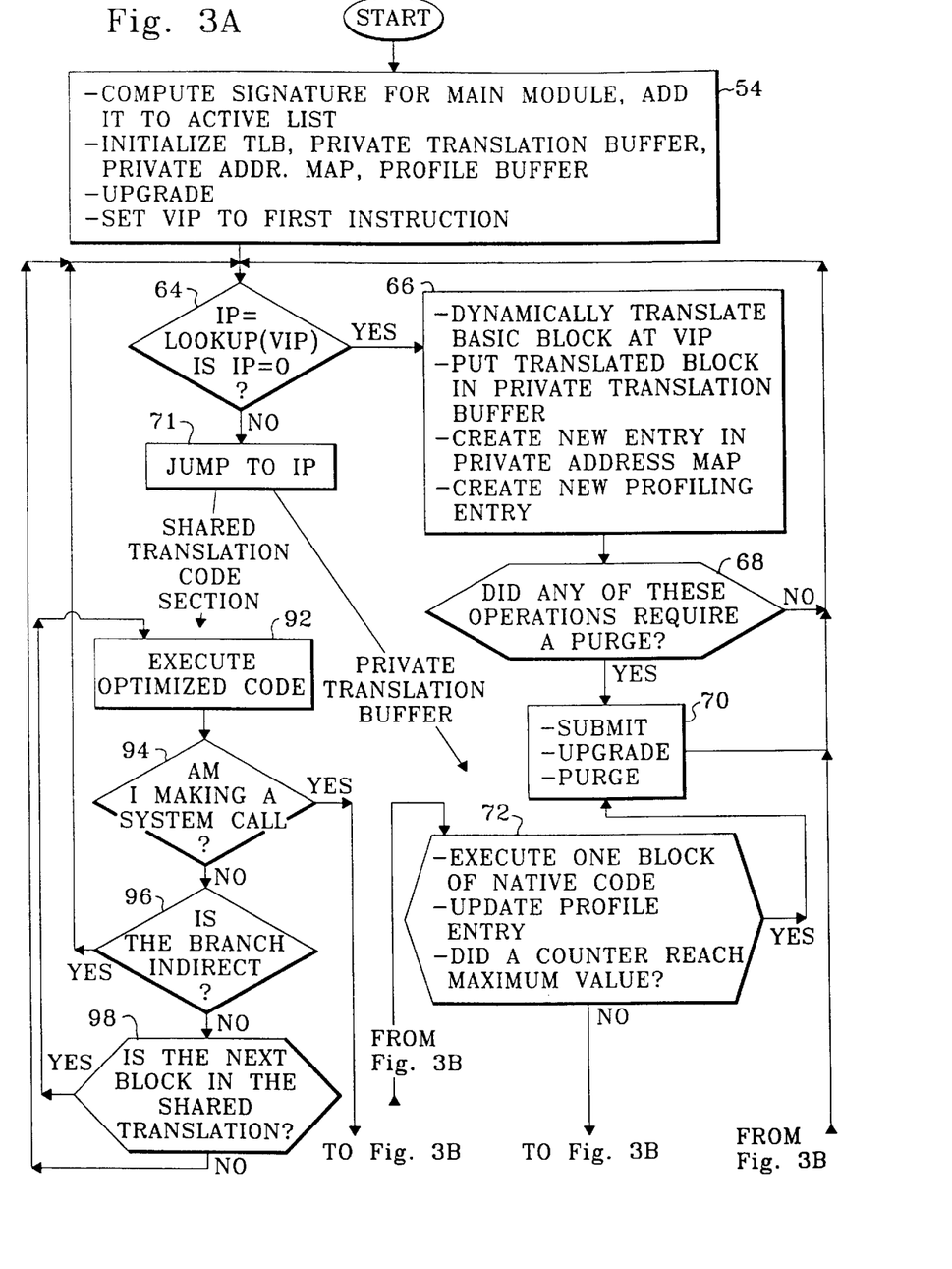

It is certified that error appears in the above-identified patent and that said Letters Patent is hereby corrected as shown below:

Column 4,
Line 16, delete "FIG. 3" and insert therefor -- FIGS. 3A and 3B show --

Column 5,
Line 31, delete "19" and insert therefor -- 12 --

Column 6,
Line 25, delete "FIG. 3" and insert therefor -- FIGS. 3A and 3B --

Signed and Sealed this

Third Day of September, 2002

Attest:

JAMES E. ROGAN
*Attesting Officer*           *Director of the United States Patent and Trademark Office*